United States Patent
Kamiwada et al.

(10) Patent No.: US 6,753,888 B2
(45) Date of Patent: Jun. 22, 2004

(54) DISPLAY INTERFACE METHOD AND APPARATUS, AND A COMPUTER-READABLE STORAGE STORING A PROGRAM, FOR CONTROLLING A COMPUTER TO PERFORM DISPLAYING A PLURALITY OF OBJECTS AND PERFORMING AN OPERATION FOR DUPLICATING OR MOVING AT LEAST ONE OF THE OBJECTS

(75) Inventors: Toru Kamiwada, Kawasaki (JP); Takushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 09/729,091

(22) Filed: Dec. 5, 2000

(65) Prior Publication Data

US 2001/0009420 A1 Jul. 26, 2001

(30) Foreign Application Priority Data

Jan. 26, 2000 (JP) .......................................... 2000-016655

(51) Int. Cl.[7] .............................................. G06F 13/00
(52) U.S. Cl. ........................................ 345/782; 345/619
(58) Field of Search ................................ 345/782, 848, 345/770, 619

(56) References Cited

U.S. PATENT DOCUMENTS

| | | | | |
|---|---|---|---|---|
| 5,404,442 A | * | 4/1995 | Foster et al. ................. | 345/769 |
| 5,598,524 A | * | 1/1997 | Johnston et al. ............. | 345/769 |
| 5,657,049 A | * | 8/1997 | Ludolph et al. .............. | 345/856 |
| 5,659,791 A | * | 8/1997 | Nakajima et al. ............ | 715/539 |
| 5,835,094 A | * | 11/1998 | Ermel et al. ................. | 345/848 |
| 5,880,733 A | * | 3/1999 | Horvitz et al. ............... | 345/850 |
| 6,002,402 A | * | 12/1999 | Schacher ...................... | 345/810 |
| 6,023,272 A | * | 2/2000 | Malamud et al. ............ | 345/779 |
| 6,456,307 B1 | * | 9/2002 | Bates et al. .................. | 345/838 |

FOREIGN PATENT DOCUMENTS

| | | |
|---|---|---|
| JP | 7-146863 | 6/1995 |
| JP | 8-22383 | 1/1996 |

OTHER PUBLICATIONS

Griffith Wm. Kadnier, Windows NT 4: The Complete Reference, Copyright 1997, Chapter 6.*
Paul Cassell, Using Windows NT Workstation 4, Que, Copyright 1998, pp. 1–7 and 1–3 of Chapter 1.*
"Making Information Access As Easy As Operating a TV Set", Fujitsu Journal, No. 243, vol. 25 No. 3, 1999.
Kamiwada and Fujita, "Information browsing using a zoom interface" in collected papers (4) of the 58th national convention (Information Processing Society of Japan, 1999).

* cited by examiner

*Primary Examiner*—Cao Nguyen
(74) *Attorney, Agent, or Firm*—Staas & Halsey, LLP

(57) ABSTRACT

A display interface method and apparatus that utilize a zoom interface are provided, in which the screen changes continuously and moving or duplicating operation of an object can be performed easily. The display interface method comprises the steps of memorizing a pointer that points an object selected by an input device in a memory, displaying a small image representing the object pointed by the pointer as a display of the foreground layer on the screen, and maintaining the display of the small image representing the object without changing even if a display of other layer is zoomed. A user uses a zooming operation so that the target position is displayed on the screen, and then inputs the "paste" command, for example. Thus, a copy of the object is generated and is pasted at the designated position in the target folder.

16 Claims, 13 Drawing Sheets

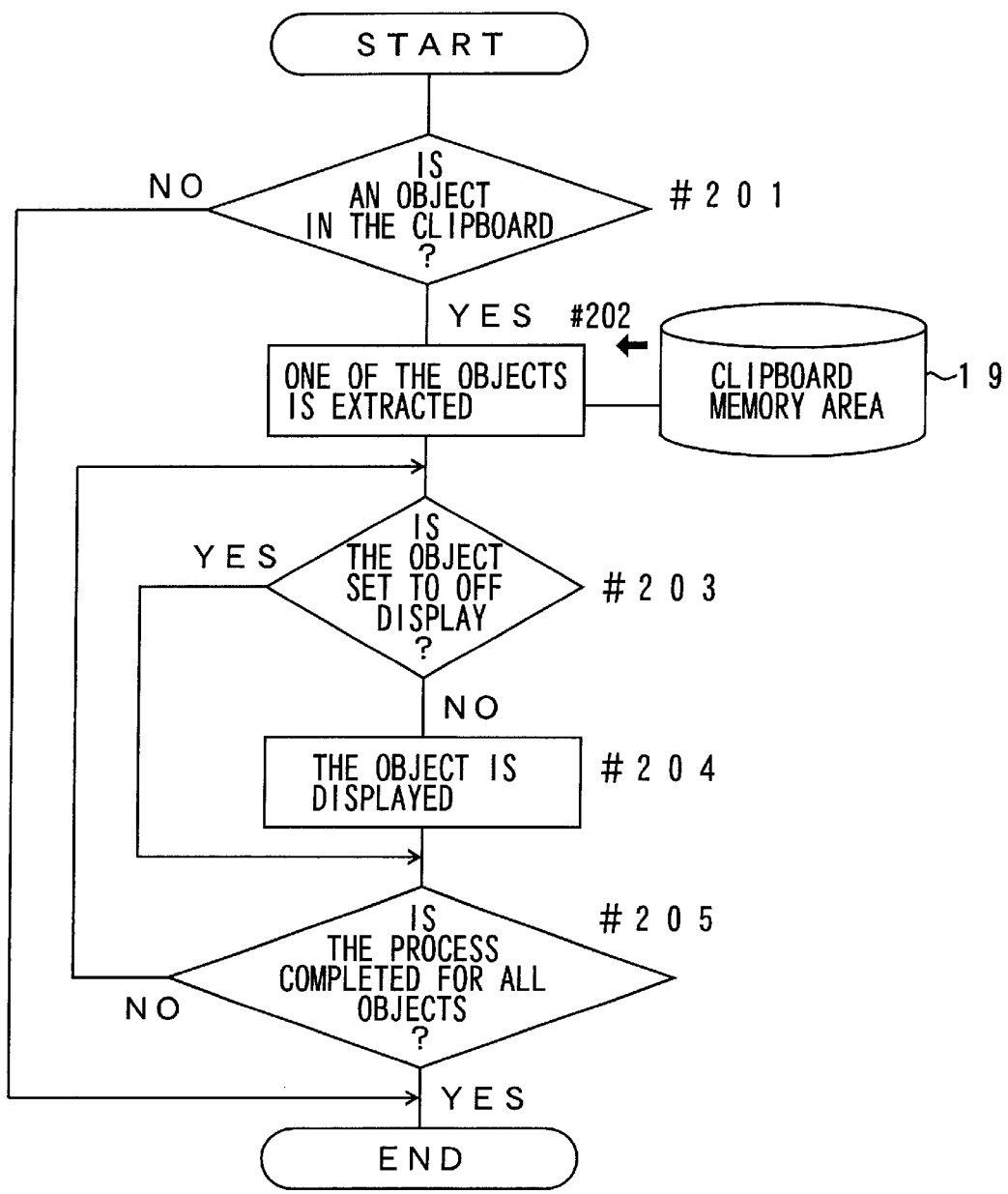

DISPLAY INTERFACE METHOD AND APPARATUS, AND A COMPUTER-READABLE STORAGE STORING A PROGRAM, FOR CONTROLLING A COMPUTER TO PERFORM DISPLAYING A PLURALITY OF OBJECTS AND PERFORMING AN OPERATION FOR DUPLICATING OR MOVING AT LEAST ONE OF THE OBJECTS

BACKGROUND OF THE INVENTION

1. Field of the Invention

The present invention relates to a display interface method and apparatus for displaying plural objects on a computer display screen and performing an operation such as duplicating or moving the object. More specifically, the present invention relates to a method and an apparatus of displaying contents of a clipboard that provides a temporary memory when a text or an image is processed on a computer display screen.

2. Description of the Prior Art

There are two methods for duplicating or moving a text or an image that is displayed on the computer display screen to another location or program when using a program for processing the text or the image. One is called drag and drop, and another is a method using a clipboard.

In the drag and drop method, an operator uses a pointing device such as a mouse for selecting an original object, dragging the object and dropping the object at a target position. For example, the original object is held by a click operation of the mouse, which is moved to the target position for dropping. In this method, the original object as well as the target position should exist in the movable area of the mouse. Otherwise, the operation requires means for displaying the target position on the screen while holing the original object by the mouse.

In the other method using a clipboard, the original object is temporarily stored in the clipboard (that is a temporary memory). After moving to the target position on the screen, the object memorized in the clipboard is pasted at the target position.

Therefore, the method using the clipboard does not have the above-mentioned limitation in the drag and drop method and can duplicate or can move an object easily even if both the original object and the target position are displayed on the screen. In addition, this method does not need means and operations for displaying the target position on the screen while holing the original object by the mouse.

However, the method using a clipboard has a disadvantage as explained below. The substance of the clipboard is usually invisible and is pasted at the target position while the operator can remember the contents of the clipboard. Therefore, if the operator forgets the contents of the clipboard, it is not sure what will be pasted at the target position until the contents of the clipboard is actually pasted. Otherwise, additional means are required for displaying the contents of the clipboard on the screen.

This disadvantage of the method using a clipboard for duplicating or moving can be a problem particularly in a screen display using a zoom interface, which is disclosed in "Information browsing using a zoom interface," Kamiwada and Fujita, Information Processing Society of Japan, collected papers (4) of the 58th national convention, pp. 279–280, 1999, for example. It is also explained in Fujitu Journal No. 243(vol. 25, No. 3/1999).

The zoom interface is a kind of display interface developed for an application, e.g., of using a television set and its remote controller in a living room for enjoying information services provided via the Internet. The zoom interface utilizes a three-dimensional display for displaying an object in a three-dimensional manner on a screen and a zooming operation by using e.g., a remote controller. For example, the operator can access relevant information smoothly by zooming in on a portion that the operator wants to see. The operator can return to the original screen easily by zooming out. This zoom interface can be also adopted as a display interface of a current personal computer, in which a pointing device such as a mouse is used.

Using the above-mentioned zoom interface, an object can be moved or duplicated between folders in a hierarchical directory structure. In such operations, an operator may pay attention to the operation of zooming in or out and may forget the contents of the clipboard as explained above. It is indicated that until the operator becomes familiar to the operation of the zoom interface, the duplicating or the moving operation of an object between folders is difficult compared with the normal multi-window interface.

SUMMARY OF THE INVENTION

The object of the present invention is to provide a method and an apparatus for duplicating or moving an object easily using a clipboard in a zoom interface in which a display changes continuously by a zooming operation.

According to a first aspect of the present invention, a display interface method is provided for displaying plural objects on a computer display screen and performing an operation such as duplicating or moving the object. The method comprises the steps of memorizing a pointer that points an object selected by an input device in a memory, displaying a small image representing the object pointed by the pointer as a display of the foreground layer on the screen, and maintaining the display of the small image representing the object without changing even if a display of other layer is zoomed.

While the screen display is changed by the operation of zooming in or out in the zoom interface as explained above, the small image representing the selected object is stayed on the foreground layer without changing. Therefore, the operator is not required to remember the contents of the clipboard, so can concentrate on the zooming operation. In this specification, the small image means the image that is small compared with the entire screen. For example, if the object is an image file, the small image can be its thumbnail image. If the object is a text file, the small image can be an icon representing the file.

Preferably, the display interface method further comprises the steps of generating a copy of the object pointed by the pointer in accordance with an operation by the input device before a zooming operation, and pasting the copy at the position designated by the input device after the zooming operation. Thus, the selected object can be moved or duplicated to another position. If a moving operation of the object is instructed by the input device, the original object is erased when a copy of the object is generated (or is transferred to the clipboard). If a duplicating operation of the object is instructed, the original object remains without being erased.

It is also preferable that the display interface method further comprises the steps of generating link information for linking to the object pointed by the pointer in accordance with an operation by the input device before a zooming operation, and pasting the link information at the position designated by the input device after the zooming operation. In this case, what is pasted as the object (e.g., a shortcut icon) is not the copy of the original object but link information to the original object.

In any case mentioned above, it is not always a single object that is selected, but plural objects can be selected. In addition, if the clipboard stores plural objects, a part of the objects can be selected for being pasted at the target position. In this case, the display of the small image representing the pasted object can be turned off or can be stayed on for a continuous duplication to another position. Namely, there are two cases, in one of which the contents of the clipboard change, and in the other case the contents of the clipboard do not change.

It is also preferable that the display interface method further comprises the step of switching the display of the small image representing the object pointed by the pointer between on and off in accordance with an operation by the input device.

According to the second aspect of the present invention, a display interface method is provided for displaying plural objects on a computer display screen and performing an operation such as duplicating or moving the object. The method comprises the steps of generating a copy of an object selected by an input device, so as to memorize the copy in a memory, displaying a small image representing the copy memorized in the memory as a display of the foreground layer on the screen, and maintaining the display of the small image representing the copy without changing even if a display of other layer is zoomed.

In contrast to the above-mentioned first aspect in which the pointer that points the selected object is memorized, the copy of the object itself is generated and is memorized in this second aspect. In this case too, in the same way as the first aspect, the small image representing the selected image is stayed on the foreground layer without changing while the screen display is changed by the operation of zooming in or out in the zoom interface. Therefore, the operator is not required to remember the contents of the clipboard, so can concentrate on the zooming operation.

Preferably, the display interface method further comprises the step of pasting the copy memorized in the memory at the position designated by the input device after the zooming operation. Thus, the selected object can be moved or duplicated to another position.

In this second aspect too, it is preferable that the display interface method further comprises the step of switching the display of the small image representing the copy memorized in the memory between on and off in accordance with an operation by the input device.

According to the third aspect of the present invention, a display interface method is provided for displaying plural objects on a computer display screen and performing an operation such as duplicating or moving the object. The method comprises the steps of generating a copy of an object selected by an input device, so as to memorize the copy in a memory, memorizing a pointer that points the selected object in a memory, displaying a small image representing the copy memorized in the memory as a display of the foreground layer on the screen, and maintaining the display of the small image representing the copy without changing even if a display of other layer is zoomed.

The present invention also provides a display interface apparatus for performing the above-mentioned display interface method.

Furthermore, the present invention also provides a computer readable recording medium that stores a program for performing the above-mentioned display interface method.

BRIEF DESCRIPTION OF THE DRAWINGS

FIG. 7 is a flowchart showing the process of displaying the small image in FIG. 6.

DESCRIPTION OF THE PREFERRED EMBODIMENTS

Hereinafter, the present invention will be explained in detail with reference to embodiments and accompanied drawings.

Figure 1:
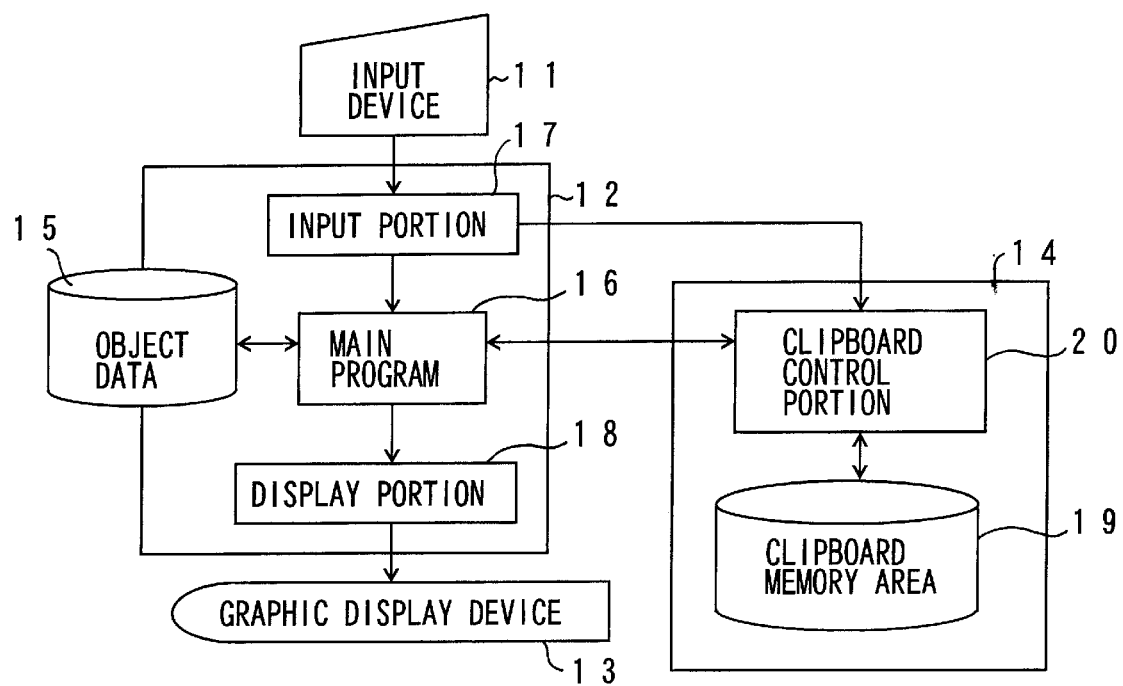
FIG. 1 is a block diagram of a file system utilizing the display interface method according to an embodiment of the present invention.

FIG. 1 is a block diagram of a file system utilizing the display interface method according to an embodiment of the present invention. This system comprises an input device 11 including a keyboard, a mouse or a remote controller, a computer 12, a graphic display device 13 such as a CRT or an LCD, and a clipboard operation portion 14 that realizes the display interface of the present invention.

This file system uses a program utilizing a zoom interface for browsing or operating object data 15 such as files and folders that are stored in an auxiliary storage in the computer 12 and are displayed on a screen of the graphic display device 13. A main program 16 including the zoom interface is loaded into the auxiliary storage and a main memory in the computer 12 by using a removable recording medium such as a CDROM or via a network, so as to be executed.

Various commands and data inputted by the input device 11 are given to the main program 16 through the input portion 17. In addition, display data that are the result of browsing and operating the object data 15 by the main program 16 in accordance with the input are given to the display device 13 via the display portion 18 and are graphically displayed on the screen.

The clipboard operation portion 14 includes a clipboard memory area 19 reserved on the main memory and a clipboard control portion 20 that controls the clipboard memory area 19. The clipboard control portion 20 is made of a program, which can be loaded by using a removable recording medium or via a network along with the main program 16.

Figure 2:
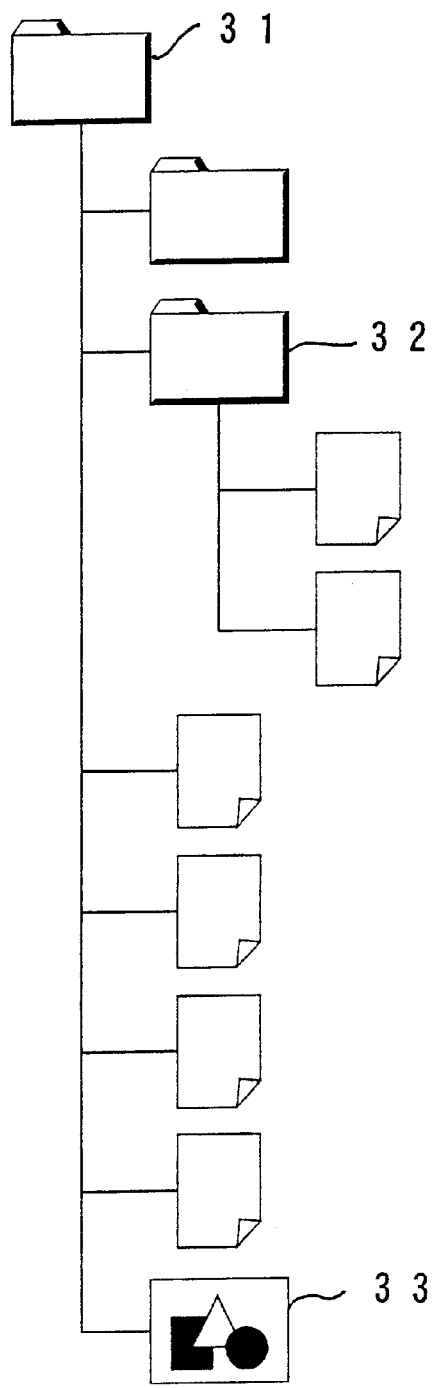
FIG. 2 shows an example of a directory structure for explaining the embodiment of the present invention.
Figure 3:
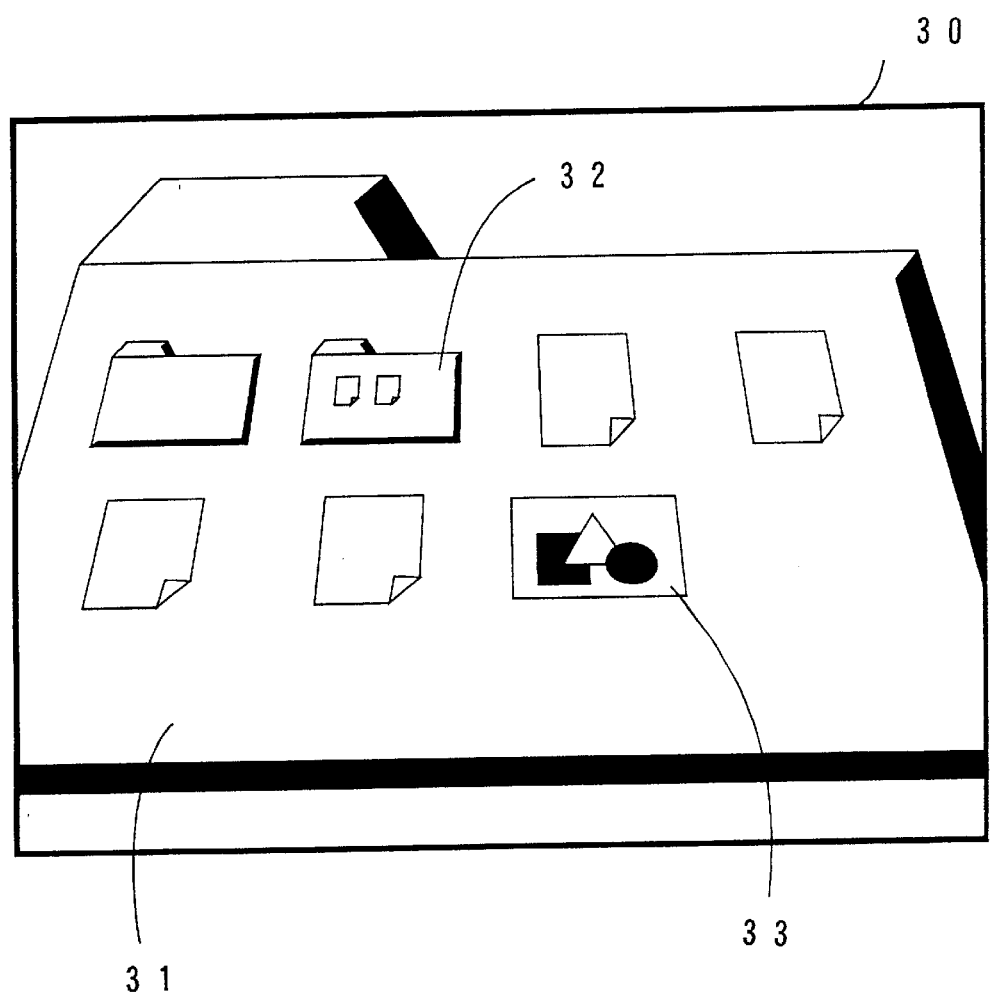
FIG. 3 shows a display example of a folder in the upper location of the directory structure shown in FIG. 2 in accordance with a zoom interface.

According to the zoom interface that is used in this file system, a folder 31 having a directory structure as shown in FIG. 2 is displayed on the screen in a three-dimensional graphic manner as shown in FIG. 3. In the illustrated example, almost the entire of the screen 30 is occupied by the folder 31, which contains subdirectory folders and files. In addition, a folder 32 of the subdirectory includes icons of files that are contained in the folder 32. In the case of image file 33, the image itself is displayed instead of the icon.

Figure 4A:
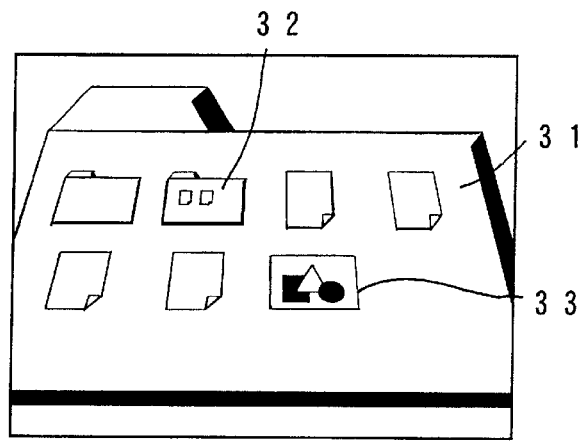
FIGS. 4A–4C show an example of moving operation of a folder by a zoom-in operation.
Figure 4B:
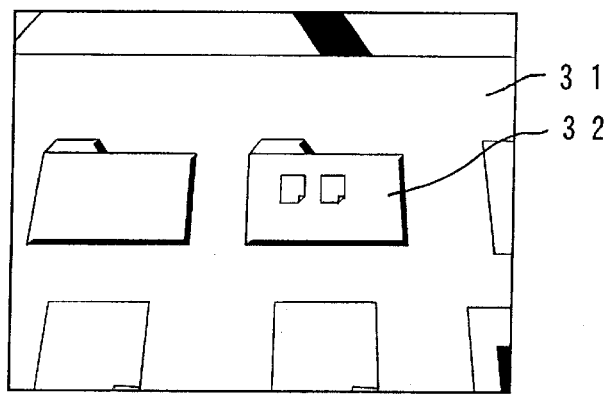
Figure 4C:
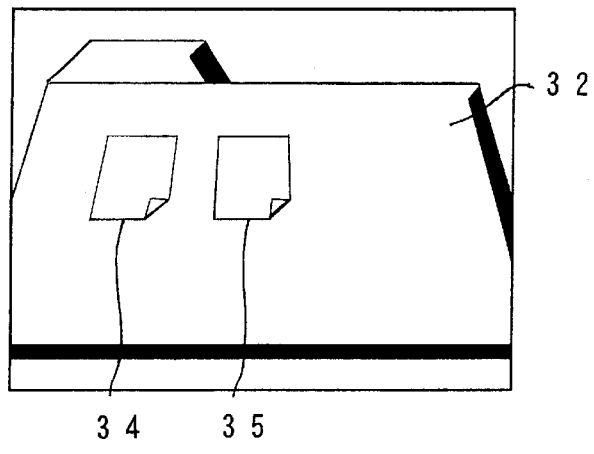

Any folder or file in the directory structure can be accessed from the screen display of FIG. 3 by the operation of zooming in or out using the input device 11. For example in FIG. 3, zooming in on the folder 32 from the state where the entire folder 31 is displayed causes the continuous change of display from FIG. 4A to FIG. 4B. Namely, the display is enlarged with respect to the position of the folder 32, until the folder 32 is displayed in almost the entire of the screen as shown in FIG. 4C, and files 34, 35 in the folder 32 become visible.

In the file system using the above-mentioned zoom interface, an operation of duplicating the image file 33 in the folder 31 to the folder 32 will be explained below as an example. First, the user of the system (the operator) moves the image file 33 in the folder 31 by the zooming operation using the input device 11 so that the image file 33 can be seen. Then, the operator selects the image file 33 by the input device 11 and input the "copy" command. The main program 16 and the clipboard control portion 20 (hereinafter, simply referred to as the program) stores the pointer of the selected image file 33 in the clipboard memory area 19 in accordance with a flowchart as shown in FIG. 5.

Figure 5:
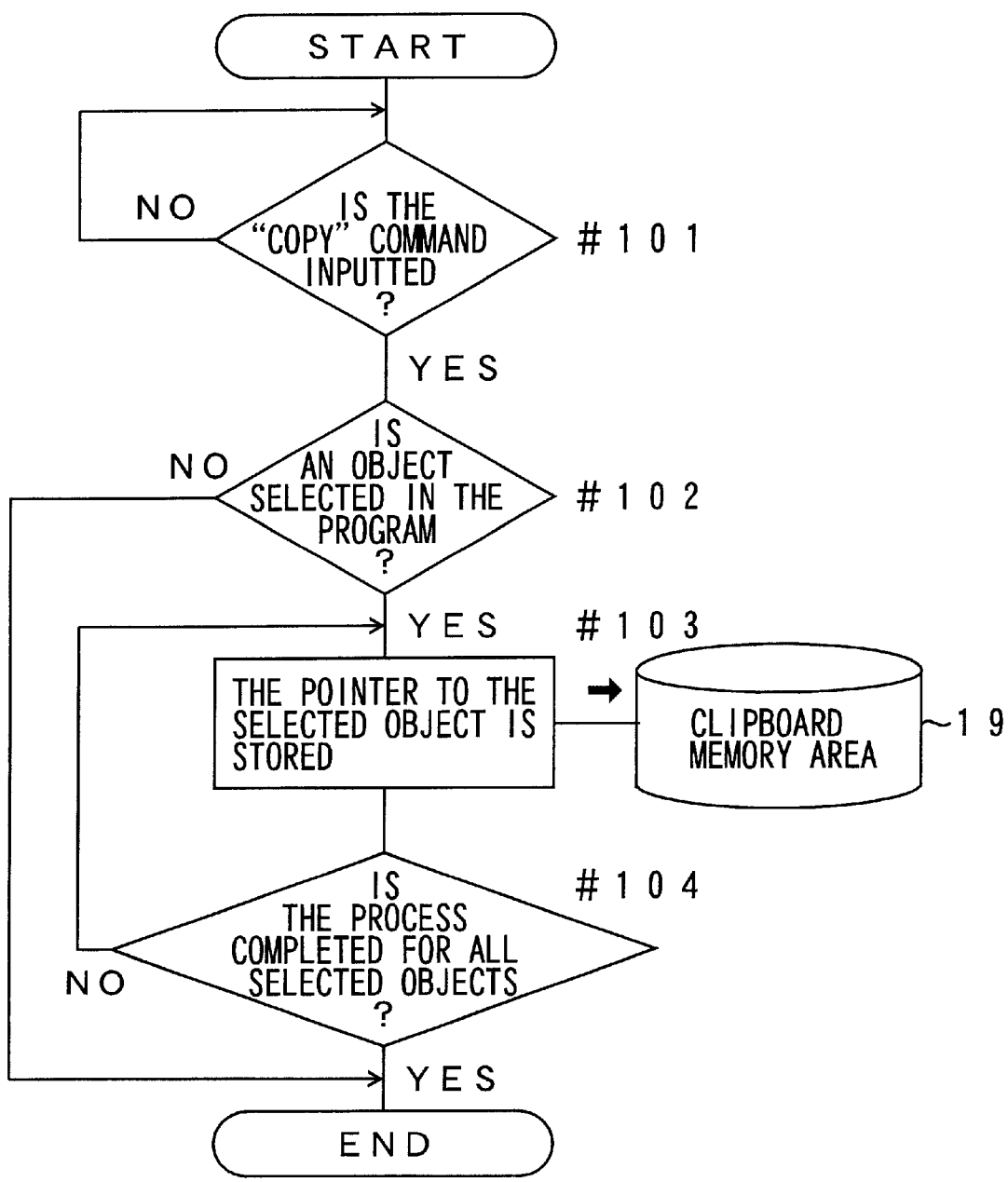
FIG. 5 is a flowchart of the process of storing a pointer of the selected object in a clipboard memory area.

Referring to FIG. 5, when the input of the "copy" command is detected in Step #101, the process goes to the decision in Step #102, where it is checked whether the original object (the image file 33 in this example) is selected. If there is no selected object (No in Step #102), the process is finished. If there is a selected object (Yes in Step #102), the process goes to Step #103, where the pointer to the selected object is stored in clipboard memory area 19.

In the next Step #104, it is checked whether the above-mentioned process is completed for all selected objects, since plural objects can be selected. After the process from Step #103 through Step #104 are repeated for all selected objects, this routine is finished.

Figure 6A:
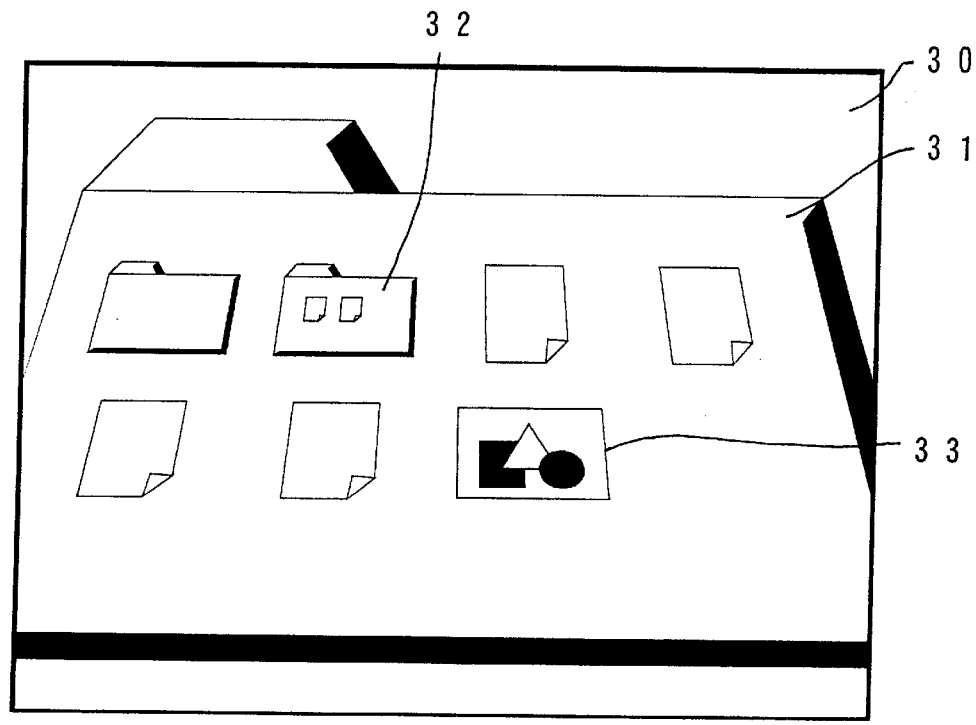
FIGS. 6A and 6B show an example of displaying a small image representing the object pointer stored in the clipboard memory area on the screen.
Figure 6B:
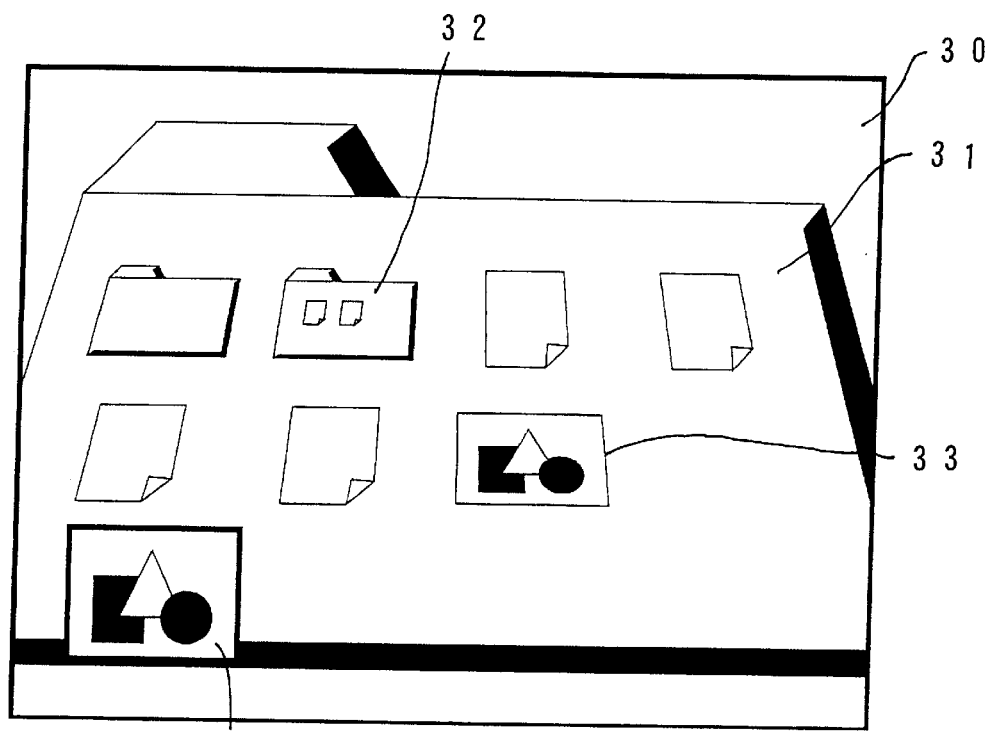

Then, the program displays a thumbnail image of the original image file 33 whose pointer is stored in the clipboard memory area 19 as a small image on the screen. Namely, when the pointer of the image file 33 is stored in the clipboard memory area 19 as shown in FIG. 6A, the thumbnail image 41 of the image file 33 is displayed at e.g., the lower left corner of the screen 30 as show in FIG. 6B by the above-mentioned process.

This thumbnail image 41 is displayed on the foreground layer. Even if the other display on the background layer changes along with the zooming operation, the thumbnail image 41 stays on without changing. In addition, though images that change along with the zooming operation are displayed in the three-dimensional manner, the thumbnail image 41 is displayed normally in the two-dimensional manner. If the original object is not an image file but a text file for example, an icon that represents the object is displayed as the small image instead of the thumbnail image. The small image such as a thumbnail image or an icon can be switched between on and off on display by the input signal from the input device 11. If the small image is switched to off display, the portion of the zoom interface display on the background appears.

FIG. 7 is a flowchart showing the process of displaying the above-mentioned thumbnail image 41. In Step #201, it is checked whether there is an object in the clipboard. If there is no object, the process is finished. If there are objects, one of them is extracted from the clipboard memory area 19 in Step #202.

In the next Step #203, it is checked whether the object is set to off display. If the object is not set to off display (No in Step #203), the object (the small image including the thumbnail image 41) is displayed in Step #204, and the process goes to Step #205. If the object is set to off display (Yes in Step #203), the process skips Step #204 and goes to Step #205.

In Step #205, it is checked whether the above-mentioned process is completed for all objects, since plural objects can be in the clipboard. After the process from Step #202 through Step #205 is repeated for all objects in the clipboard, this routine is finished.

Figure 8A:
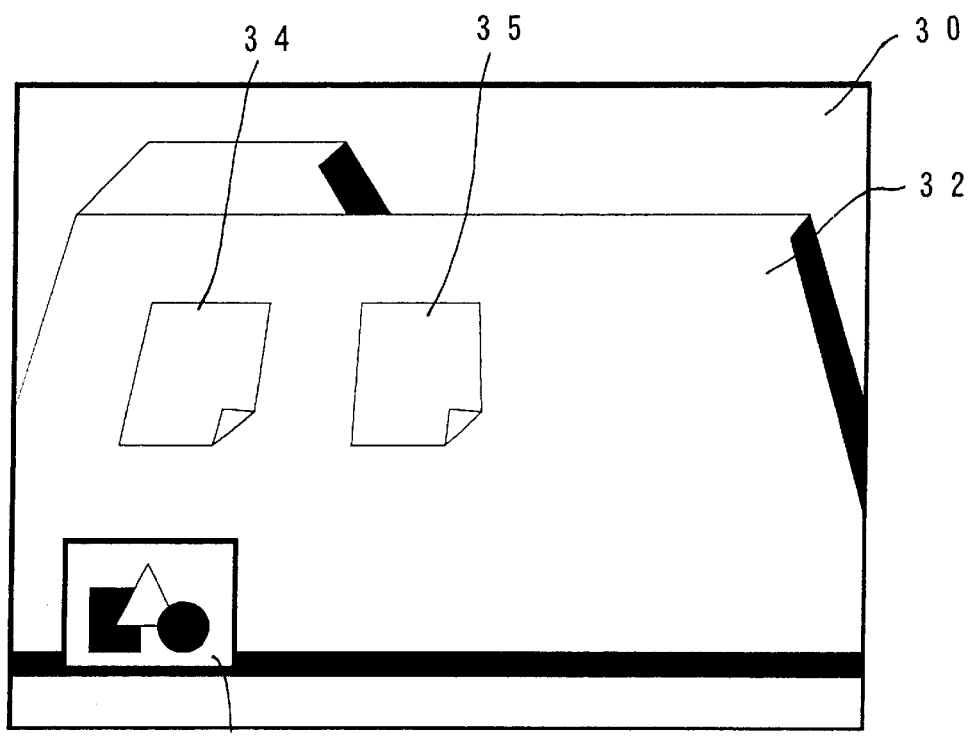
FIGS. 8A and 8B show the process of pasting the object pointed by the pointer stored in the clipboard memory area to the target folder.

As explained above, the user uses the input device 11 for the zooming operation of the screen display and for moving to the folder 32 while the thumbnail image 41 is displayed on the lower left corner of the screen 30. Then the "paste" command is inputted, and the image file 33 pointed by the pointer memorized in the clipboard memory area 19 is pasted in the folder 32. Namely, when the folder 32 and the files (the objects) 34, 35 in the folder 32 are displayed in almost the entire of the screen 30, and the thumbnail image 41 that represents the original object is displayed on the lower left corner of the screen 30 as shown in FIG. 8A, the input of the "paste" command makes the display change as shown in FIG. 8B.

Figure 8B:
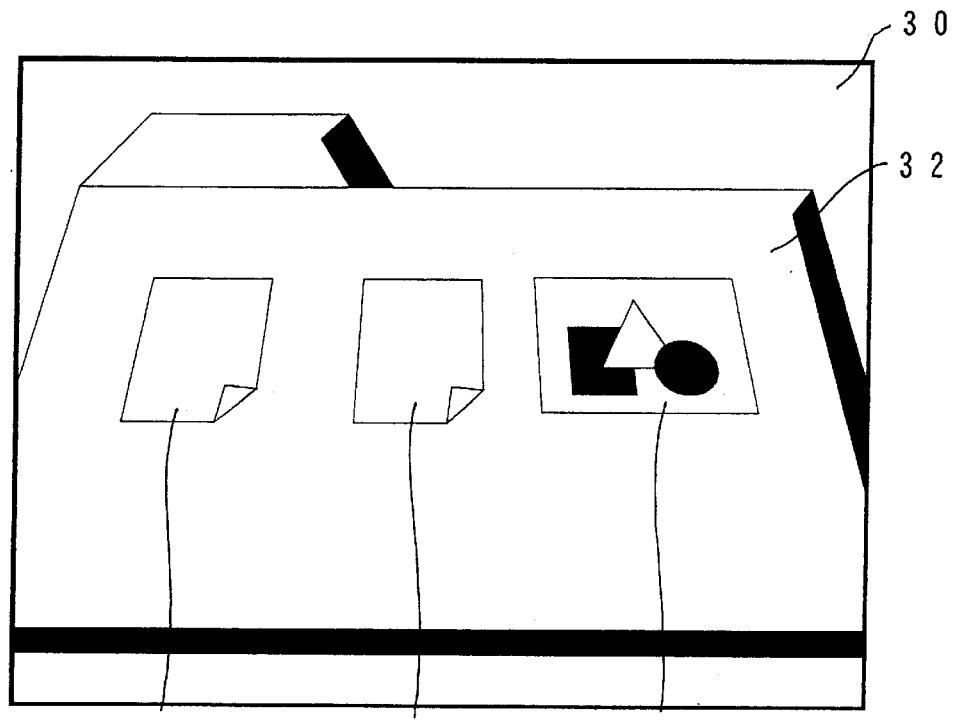

As understood with reference to FIG. 8B, a copy 51 of the original image file 33 represented by the thumbnail image 41 is newly generated in the folder 32. Then, the display of the thumbnail image 41 goes off, and the pointer to the original image file 33 memorized in the clipboard memory area 19 is erased. However, if a "continuous paste" command is inputted for pasting the same object to another position continuously, the display of the thumbnail image 41 and the memory of the pointer to the image file 33 are remained.

Figure 9:
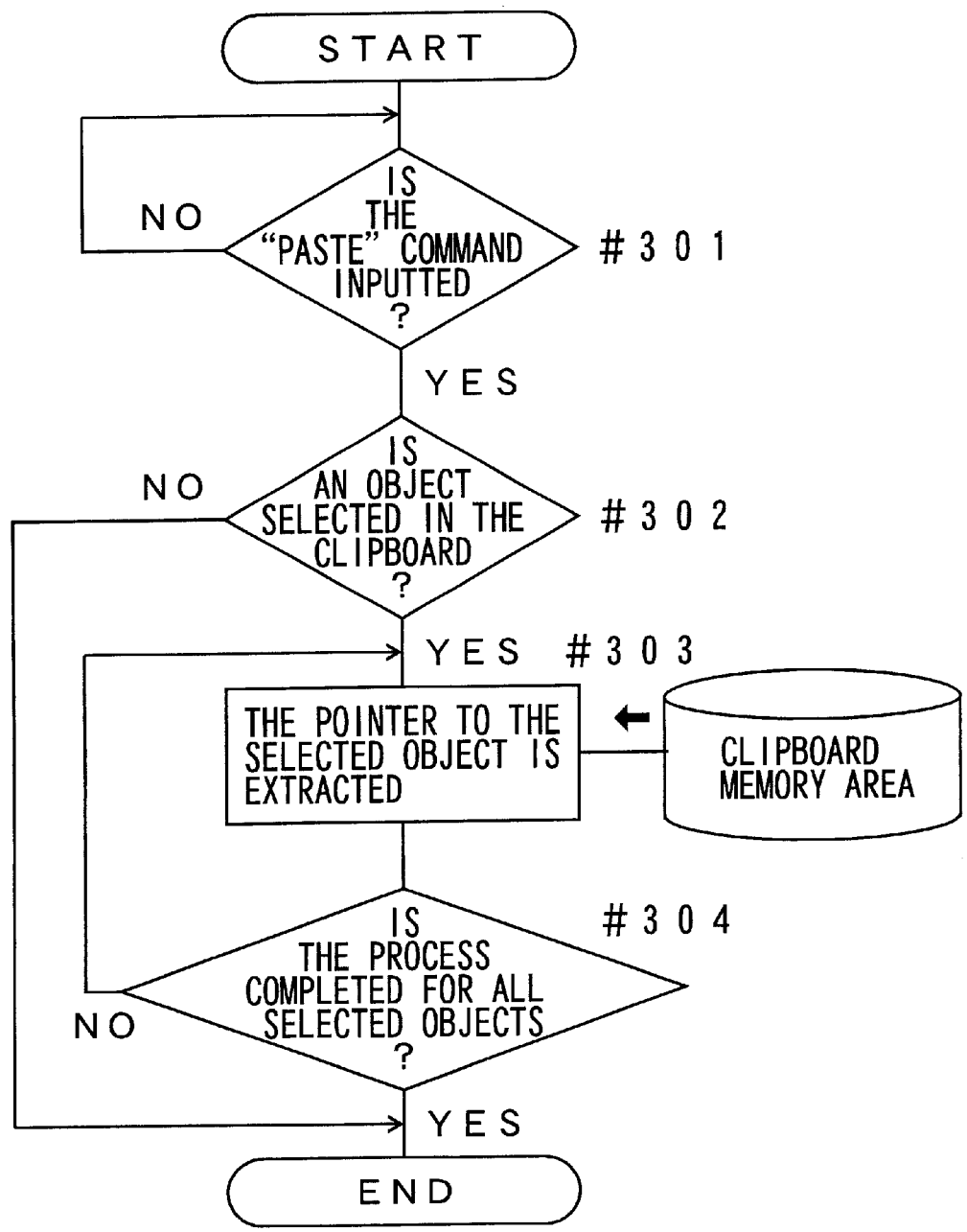
FIG. 9 is a flowchart showing the process of pasting the object in FIG. 8.

FIG. 9 is a flowchart showing a process performed by the program when the above-mentioned "paste" command is inputted. When the input of the "paste" command is detected in Step #301, it is checked whether an object is selected in the clipboard in Step #302. As explained above, plural links to plural objects can be memorized in the clipboard memory area 19, and in this case, one or more objects to be pasted are selected before inputting the "paste" command.

If no object is selected in the clipboard (No in Step #302), the process is finished. If an object is selected (Yes in Step #302), the process goes to Step #303, and the pointer to the selected object is extracted from the clipboard memory area 19.

In the next Step #304, it is checked whether the above-mentioned process is completed for all selected objects, since plural objects can be selected. After the process from Step #303 through Step #304 is repeated for all selected objects, this routine is finished.

Figure 10A:
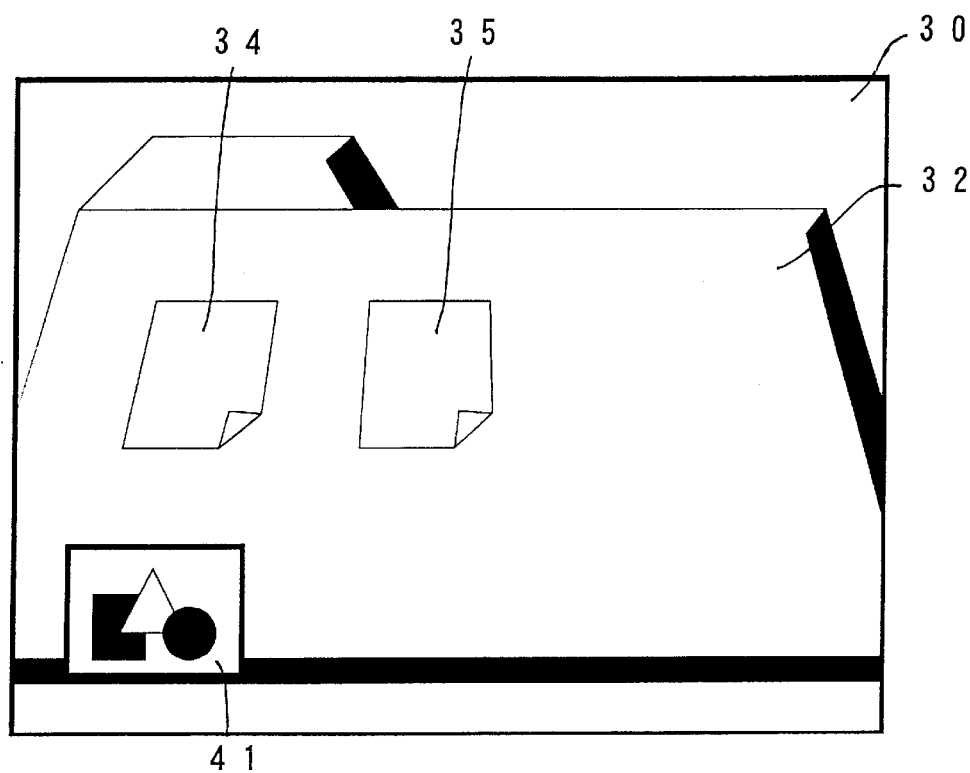
FIGS. 10A and 10B show the process of pasting the icon representing the link information to the object pointed by the pointer stored in the clipboard memory area.

In the above-mentioned operation, if a "link generation" (generation of a shortcut) command is inputted instead of the "paste" command, an icon representing the link information (the shortcut) to the image file 33 is generated as a new object in the folder 32 instead of a copy of the image file 33. Namely, when the folder 32 and the files (the objects) 34, 35 in the folder 32 are displayed in almost the entire of the screen 30, and the thumbnail image 41 that represents the original object is displayed on the lower left corner of the screen 30 as shown in FIG. 10A, the input of the "link generation" command makes the display change as shown in FIG. 10B.

Figure 10B:
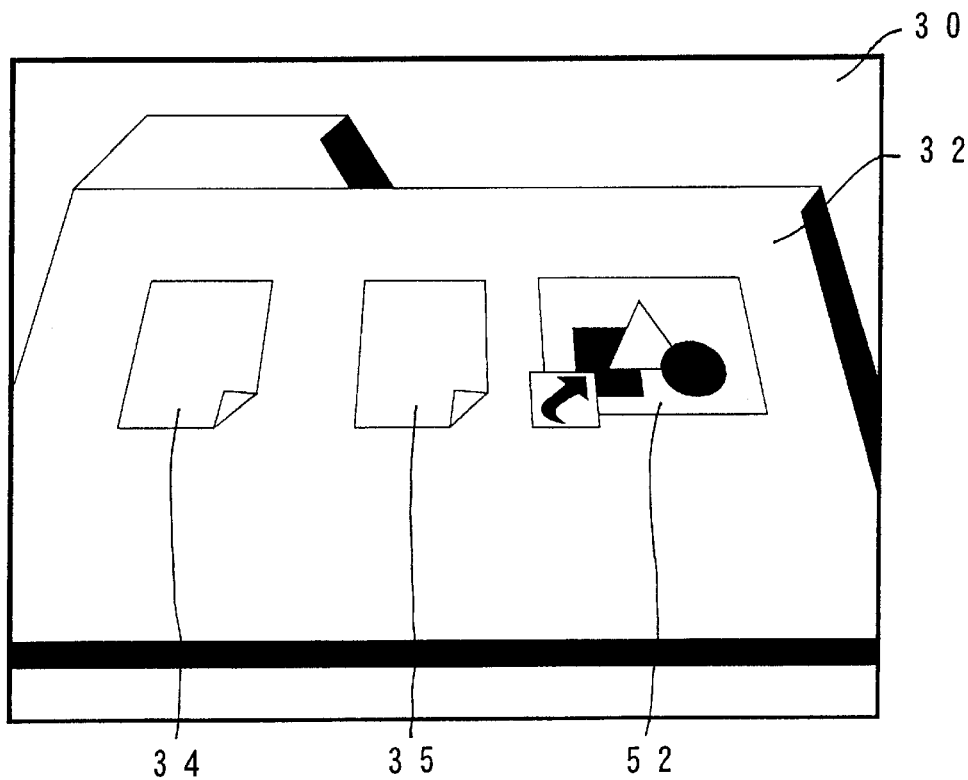

As understood with reference to FIG. 10B, an icon 52 representing the link to the original image file 33 indicated by the thumbnail image 41 is newly generated in the folder 32. In the same way as the above-mentioned "paste" command, the display of the thumbnail image 41 goes off, and the pointer to the original image file 33 memorized in the clipboard memory area 19 is erased. However, if a "continuous link generation" command is inputted for pasting the same link information to another position continuously, the display of the thumbnail image 41 and the memory of the pointer to the image file 33 are remained.

In the input operation of the "copy" command explained with reference to the flowchart of FIG. 5, if a "move" command is inputted instead of the "copy" command, a movement of the object can be performed instead of the copy (or the link generation) of the object. In this case, the original object is copied to the clipboard and is erased. The example of the display is shown in FIGS. 11A and 11B.

Figure 11A:
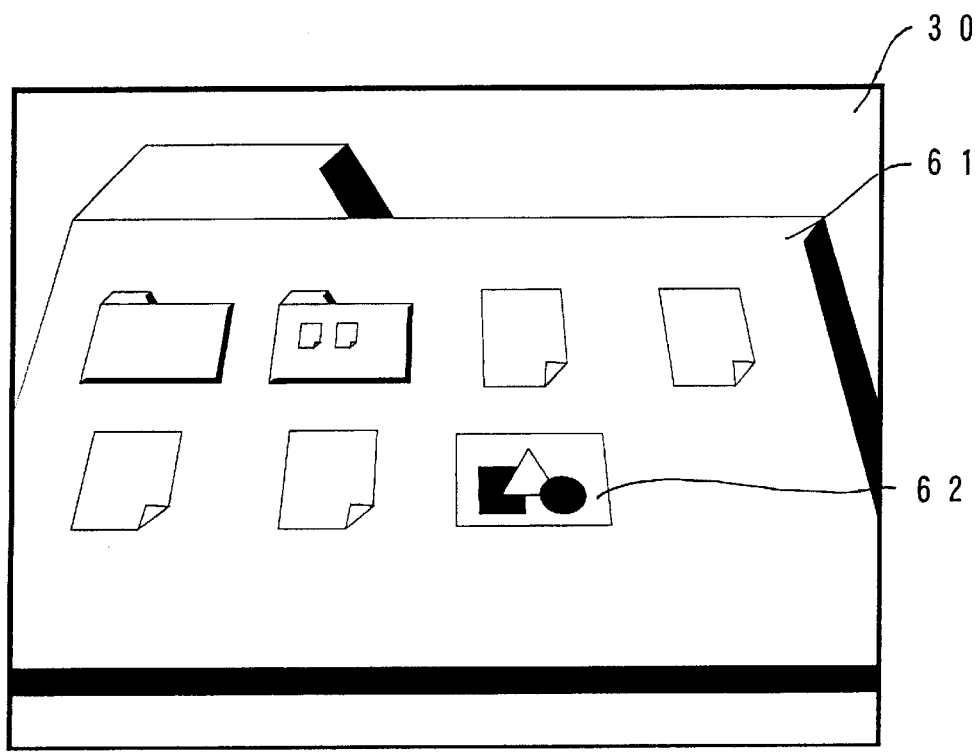
FIGS. 11A and 11B show the process of storing the selected object in the clipboard memory area and erasing the original object in accordance with the input of the "move" command.
Figure 11B:
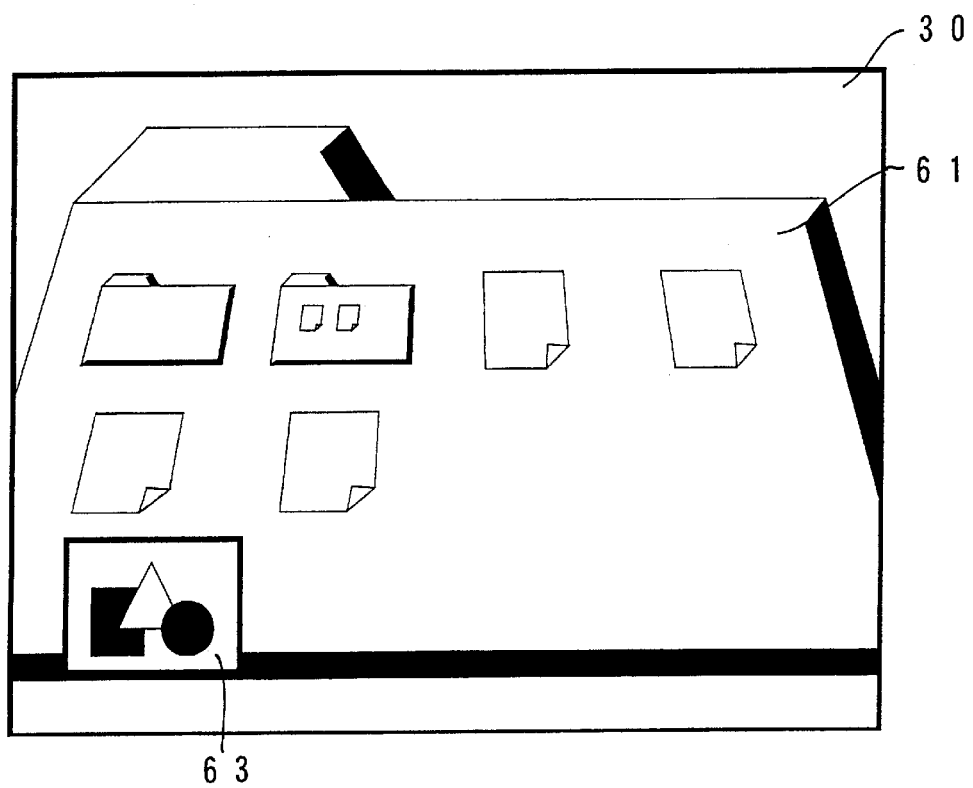

As shown in FIG. 11A, the folder 61 including the image file 62 that is the original object is displayed in almost the entire of the screen 30. In this state, the image file 62 is selected and the "move" command is inputted. Then, as shown in FIG. 11B, the image file 62 is copied (or moved) to the clipboard, and the image file 62 in the folder 61 is erased. In this case, the clipboard memory area 19 stores not the pointer but the image file 62 itself.

On the lower left corner of the screen 30 (in an example), in the same way as the above-mentioned "copy" command, the thumbnail image 63 of the image file stored in the clipboard memory area 19 is displayed as the small image. Then, as explained with reference to FIGS. 8 and 9, the target folder is displayed on the screen and the "paste" command is inputted, so that the image file in the clipboard memory area 19 is pasted to the target folder. In the case of the "move" command, the original object is erased as explained above. Therefore, the "link generation" command cannot be inputted in the target folder instead of the "paste" command.

Figure 12:
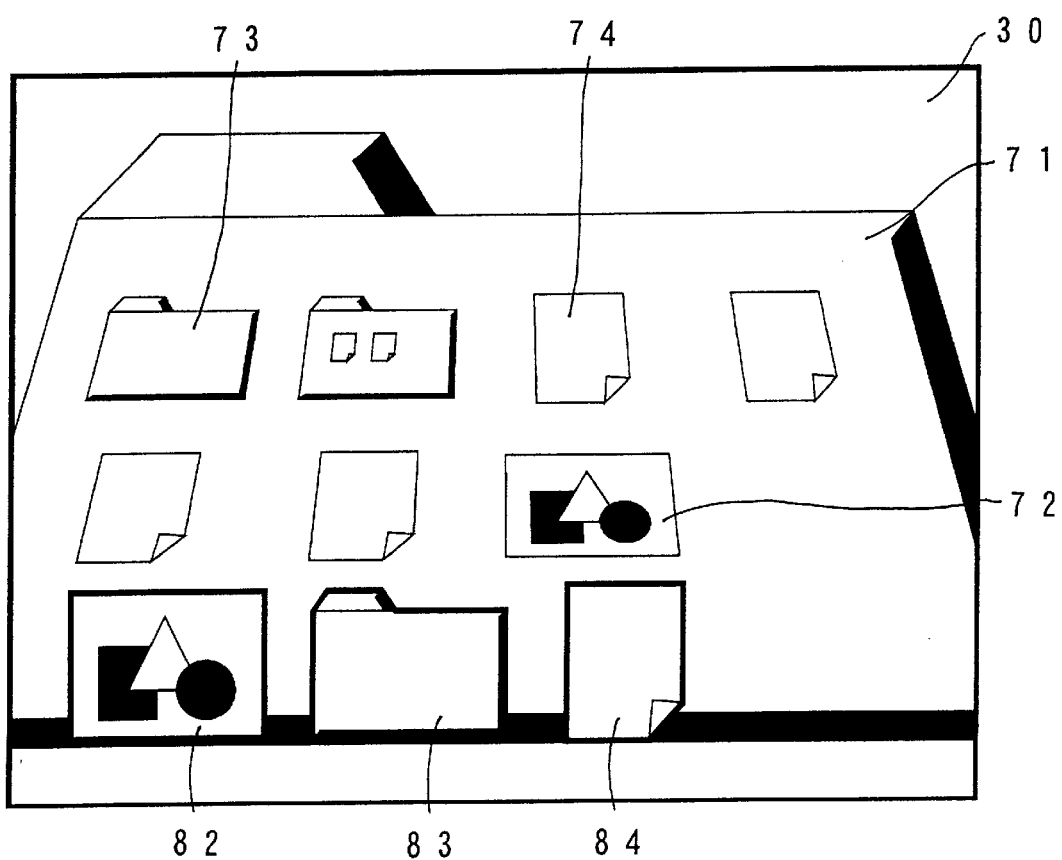
FIG. 12 shows a display example of the state where the plural objects are stored in the clipboard.

As mentioned above, the clipboard can store plural objects. A display example of the small image representing the contents of the clipboard is shown in FIG. 12. In FIG. 12, the folder 71 including the original object is displayed in almost the entire of the screen 30. In this state, an image file 72, a folder 73 and a text file 74 are copied sequentially to the clipboard as the original objects.

From the left end of the lower side of the screen 30, a thumbnail image 82 representing the image file 72, an icon 83 representing the folder 73, and an icon 84 representing the text file 74 are displayed in the order as the small images. As explained above, one or more of these small images 82, 83 and 84 are selected before inputting the "paste" command or the "link generation" command.

Figure 13:
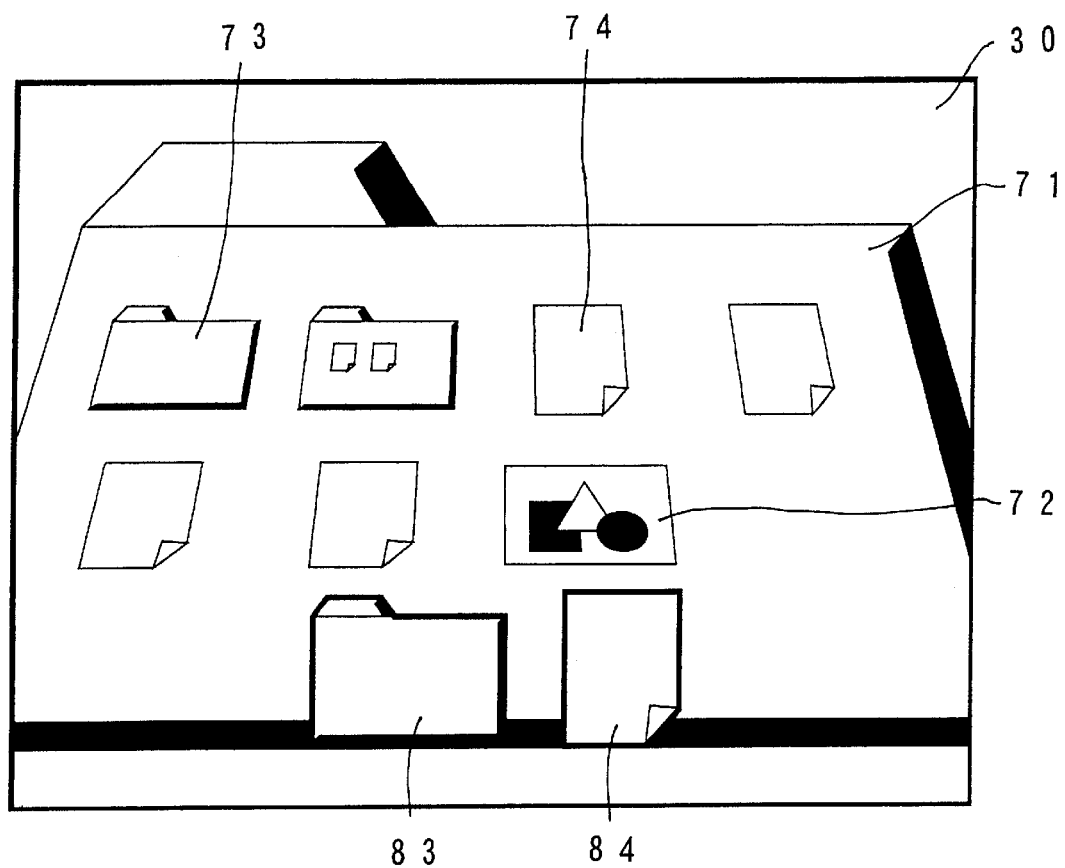
FIG. 13 shows a display example of the state where one of the plural small images representing the objects of the display shown in FIG. 12 is set to off display.

In addition, if the clipboard stores plural objects, the above-mentioned switch of the display of the small image between on and off is preferably set for each object. FIG. 13 shows the state where only the thumbnail image 82 representing the image file 72 is set to off display in the display of FIG. 12.

The display position of the small image representing the object whose pointer or substance is stored in the clipboard is not limited to the lower left corner or the left side of the screen, but can be any position one the screen. In addition, it is possible that a pointing device is used for changing the display position.

The examples of duplicating or moving a file in the above-explained embodiment of the present invention are performed between folders that are not so distant from each other in the hierarchical directory. However, the display interface method of the present invention is useful particularly for duplicating or moving a file or a holder between folders that are more distant from each other in the hierarchical directory.

As explained above, according to the display interface method and apparatus of the present invention, moving or duplicating an object can be performed easily using a clipboard, especially in a display interface such as a zoom interface in which the screen changes continuously. The contents of the clipboard can be displayed separately from the display that is zoomed. Therefore, the user is not required to memorize the contents of the clipboard and can concentrate on the zooming operation.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A display interface method for displaying a plurality of objects and performing an operation for duplicating or moving at least one of the objects by using a zoom interface, comprising:

memorizing a pointer that points to an object, selected by an input device, in a memory;

displaying a small image representing the object, pointed to by the pointer, as a display of a foreground layer on a computer display screen; and maintaining the display of the small image, representing the object, without change even if a display of another layer is zoomed.

2. The display interface method according to claim 1, further comprising:

generating a copy of the object, pointed to by the pointer, in accordance with an operation inputted by the input device before a zooming operation; and pasting the copy at a position, designated by the input device, after the zooming operation.

3. The display interface method according to claim 1, further comprising:

generating link information, linking to the object pointed to by the pointer, in accordance with an operation inputted by the input device before a zooming operation; and pasting the link information at a position designated by the input device after the zooming operation.

4. The display interface method according to claim 1, further comprising switching the display of the small image, representing the object pointed to by the pointer, between an on-display state and an off-display state, in accordance with a signal from the input device.

5. A display interface method for displaying a plurality of objects and performing an operation for duplicating or moving at least one of the objects by using a zoom interface, comprising:

generating a copy of an object, selected by an input device, so as to memorize the copy in a memory;

displaying a small image, representing the copy memorized in the memory, as a display of a foreground layer on a computer display screen; and maintaining the display of the small image, representing the copy without change, even if a display of another layer is zoomed.

6. The display interface method according to claim 5, further comprising pasting the copy memorized in the memory at the position designated by the input device after the zooming operation.

7. The display interface method according to claim 5, further comprising switching the display of the small image, representing the copy memorized in the memory, between an on-display state and an off-display state, in accordance with a signal from the input device.

8. A display interface method for displaying a plurality of objects and performing an operation for duplicating or moving at least one of the objects by using a zoom interface comprising:

generating a copy of an object, selected by an input device, so as to memorize the copy in a memory;

memorizing a pointer that points to the selected object in a memory;

displaying a small image, representing the copy memorized in the memory, as a display of a foreground layer on a computer display screen; and maintaining the display of the small image, representing the copy, without change even if a display of another layer is zoomed.

9. A display interface apparatus displaying a plurality of objects and performing an operation duplicating or moving at least one of the objects by using a zoom interface, comprising:

a computer display screen;

a memory memorizing a pointer that points to an object, selected by an input device, in the memory;

means for displaying a small image representing the object, pointed to by the pointer, as a display of a foreground layer on the screen; and means for maintaining the display of the small image, representing the object, without change even if a display of another layer is zoomed.

10. A display interface apparatus displaying a plurality of objects and performing an operation for duplicating or moving at least one of the objects by using a zoom interface, comprising:

a computer display screen;

means for generating a copy of an object, selected by an input device;

a memory memorizing the copy, generated by the generating means;

means for displaying a small image, representing the copy memorized in the memory, as a display of a foreground layer on the screen; and means for maintaining the display of the small image, representing the copy without change, even if a display of another layer is zoomed.

11. A computer-readable storage storing a program for controlling a computer to perform displaying a plurality of objects, and performing an operation for duplicating or moving at least one of the objects, by using a zoom interface, by:

memorizing a pointer that points to an object, selected by an input device in a memory;

displaying a small image representing the object, pointed by the pointer, as a display of a foreground layer on a computer display screen; and maintaining the display of the small image, representing the object, without change even if a display of another layer is zoomed.

12. A computer-readable storage storing a program for controlling a computer to perform displaying a plurality of objects, and performing an operation for duplicating or moving at least one of the objects, by using a zoom interface, by:

generating a copy of an object, selected by an input device, so as to memorize the copy in a memory;

displaying a small image representing the copy, memorized in the memory as a display of the foreground layer on a computer display screen; and maintaining the display of the small image, representing the copy, without changing even if a display of another layer is zoomed.

13. A display interface apparatus, comprising:

an input device selecting an object;

a pointer pointing to the selected object;

a memory memorizing the pointer; and a display screen displaying a small image, representing the selected object, as a display of a foreground layer on the screen, and maintaining the display of the small image, representing the object, without change even if a display of another layer is zoomed.

14. The display interface apparatus according to claim 13, wherein an operation on the object is performed by using a zoom interface.

15. A display interface apparatus, comprising:

an input device selecting an object;

a computer generating a copy of the selected object;

a memory memorizing the generated copy; and a display screen displaying a small image, representing the memorized copy, as a display of a foreground layer on the screen, and maintaining the display of the small image without change even if a display of another layer is zoomed.

16. The display interface apparatus according to claim 15, wherein an operation on the object is performed by using a zoom interface.

* * * * *

UNITED STATES PATENT AND TRADEMARK OFFICE
CERTIFICATE OF CORRECTION

PATENT NO. : 6,753,888 B2
DATED : June 22, 2004
INVENTOR(S) : Toru Kamiwada et al.

It is certified that error appears in the above-identified patent and that said Letters Patent is hereby corrected as shown below:

Title page,
Item [*] Notice, delete "bydays.days." and insert -- 360 days. --

Signed and Sealed this

Fourteenth Day of December, 2004

JON W. DUDAS
*Director of the United States Patent and Trademark Office*